United States Patent [19]

Ikawa et al.

[11] Patent Number: 4,734,607
[45] Date of Patent: Mar. 29, 1988

[54] MINIATURE MOTOR WITH SPARK QUENCHING CONNECTION BETWEEN COMMUTATOR AND BRUSHES

[75] Inventors: Masaaki Ikawa; Kazuichi Mabuchi, both of Chiba, Japan

[73] Assignee: Mabuchi Motor Co., Ltd., Japan

[21] Appl. No.: 930,691

[22] Filed: Nov. 10, 1986

[30] Foreign Application Priority Data

Nov. 15, 1985 [JP] Japan .................................. 60-175928

[51] Int. Cl.$^4$ ............................................ H02K 13/10
[52] U.S. Cl. ...................... 310/233; 29/597; 310/42; 310/71; 310/72
[58] Field of Search ................ 310/220, 233, 40 MM, 310/72, 42, 71, 234; 29/597

[56] References Cited

U.S. PATENT DOCUMENTS

| | | | |
|---|---|---|---|
| 1,826,443 | 10/1931 | Aufiero et al. | 310/235 |
| 2,470,096 | 5/1949 | Eck | 310/220 |
| 3,487,248 | 12/1969 | Kaneko et al. | 310/220 |
| 3,488,538 | 1/1970 | Hayashi | 310/220 |
| 3,594,598 | 7/1971 | Schaub | 310/220 |
| 4,086,510 | 4/1978 | Watanabe | 310/72 |

*Primary Examiner*—Patrick R. Salce
*Assistant Examiner*—D. L. Rebsch
*Attorney, Agent, or Firm*—McGlew and Tuttle

[57] ABSTRACT

A miniature motor having a plurality of commutator segments with commutator terminals which are connected to rotor windings. The commutator terminals are disposed on an insulating cylinder which is fixedly fitted to a motor rotating shaft, and a spark-quenching resistor connects each of the commutator segments. This resistor is a disc-shaped electrically conductive rubber ring which is fitted to the insulating cylinder so that the end face of the disc-shaped ring comes in contact with the commutator segment and commutator terminals and is brought into intimate contact with the commutator terminals by heating.

3 Claims, 6 Drawing Figures

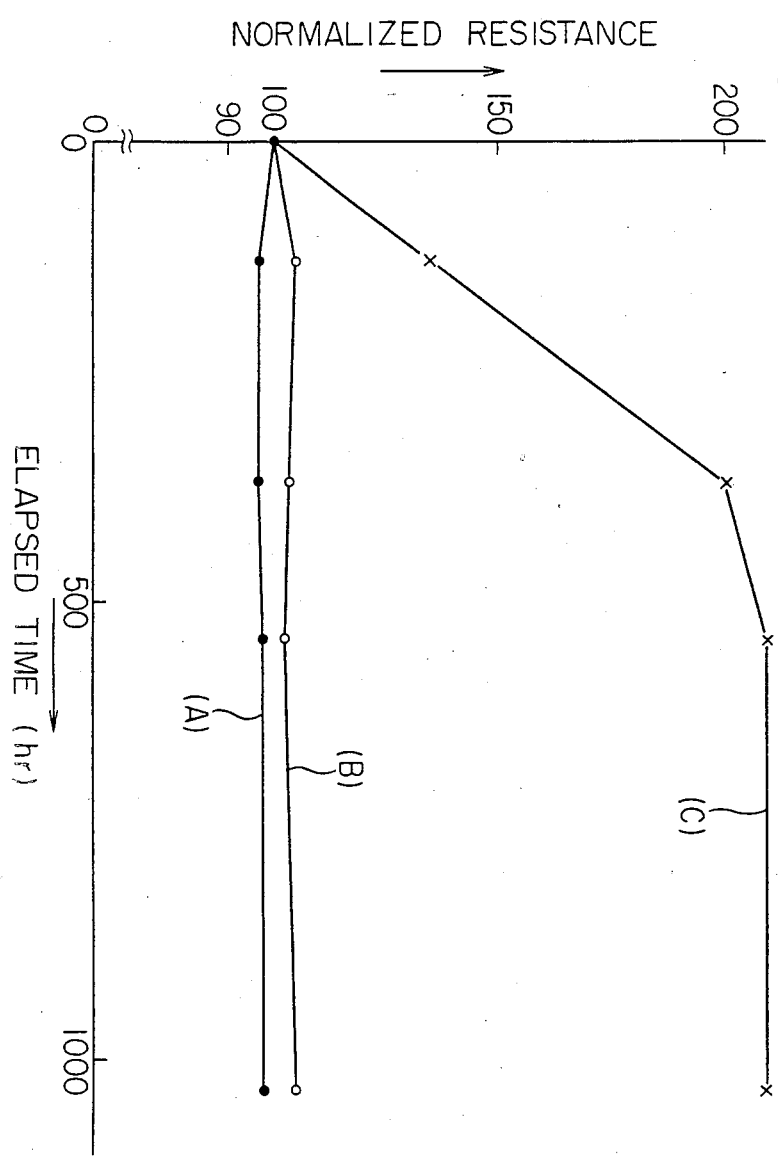

MINIATURE MOTOR WITH SPARK QUENCHING CONNECTION BETWEEN COMMUTATOR AND BRUSHES

BACKGROUND OF THE INVENTION

1. Field of the Invention

This invention relates generally to a miniature motor, and more particularly to a miniature motor being adapted to suppress spark generation between a plurality of commutator segments and brushes by connecting a resistors to each of the commutator segments.

2. Description of the Prior Art

Miniature motors having a spark-quenching means to suppress spark generation between a plurality of commutator segments and brushes by connecting resistors to each of the commutator segments are generally known.

A well-known arrangement for quenching sparks between the commutator segments and the brushes is to utilize a ring resistor in which thick-film resistors as many as the rotor poles are disposed on a ring-shaped printed circuit board with the adjoining thick-film resistors being connected with copper foil, for example; the copper foil being soldered to the commutator segments. With this arrangement, however, soldering is required to connect the ring resistor to the commutator segments, resulting in increased manufacturing cost in addition to the expensive ring resistor.

Another conventional spark-quenching arrangement is to connect rotor windings to commutator terminals provided integrally with the commutator segments, and then adhere a short cylindrical electrically conductive rubber by an electrically conductive adhesive so as to cover the commutator terminals. This arrangement also involves an unwanted problem of an electrically conductive adhesive required to adhere the ring-shaped electrically conductive rubber to the commutator.

SUMMARY OF THE INVENTION

This invention is intended to overcome the aforementioned problems.

It is an object of this invention to provide a miniature motor having a spark-quenching resistor connecting each of the commutator segments, and constructed so that a disc-shaped electrically conductive rubber ring is fixedly fitted to a insulating cylinder in such a manner that the end face of the disc-shaped rubber ring comes in contact with commutator terminals provided on commutator segments; the electrically conductive rubber ring being brought to intimate contact with the commutator terminals by heat.

BRIEF DESCRIPTION OF THE DRAWINGS

FIG. 2 is a diagram of assistance in explaining the assembly process of the embodiment shown in FIG. 1.

FIG. 3 is a diagram illustrating the curves of changes with time in resistance values between commutator segments.

DETAILED DESCRIPTION OF THE EMBODIMENT

Figure 1:
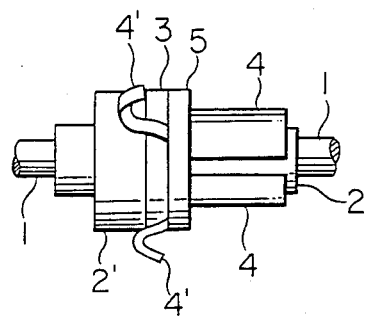
FIG. 1 is a side elevation of a commutator embodying this invention.

In FIGS. 1 through 3, reference numeral 1 refers to a motor rotating shaft; 2 to an insulating cylinder which is fixedly fitted to the motor rotating shaft 1; 2' to a flange formed in a projecting fashion on the insulating cylinder 2; 3 to an electrically conductive rubber ring having such an inside diameter as to fit the insulating cylinder 2; 4 to a commutator segment; 4' to a commutator terminal integrally formed with the commutator segment 4, to which a rotor winding is connected; and 5 to an insulating washer for fixing the commutator segment 4 disposed on the insulating cylinder 2, respectively.

In FIG. 1 illustrating an example of commutator used in a miniature motor embodying this invention, the spark-quenching electrically conductive rubber ring 3 is assembled by procedures which will be described later, and installed so as to be in contact with the commutator terminals 4'. Consequently, when rotor windings (not shown) are welded to the commutator terminals 4' by spot welding or soldering, the heat generated by spot welding or soldering causes the contact surface of the electrically conductive rubber ring 3 with the commutator terminals 4' to be melted or softened, resulting in an intimate contact of the electrically conductive rubber ring 3 with the commutator terminals 4'. In other words, an electrical connection between the spark-quenching electrically conductive rubber ring 3 and the commutator terminals 4' is automatically effected by welding the rotor windings to the commutator terminals, eliminating the need for joining the electrically conductive rubber ring 3 with the commutator terminals 4'. Whereas FIG. 1 shows the state where the commutator according to this invention has been assembled, the assembly process of the embodiment shown in FIG. 1 will be described to facilitate the understanding of this invention, referring to FIGS. 2(A) through (C).

Figure 2A:
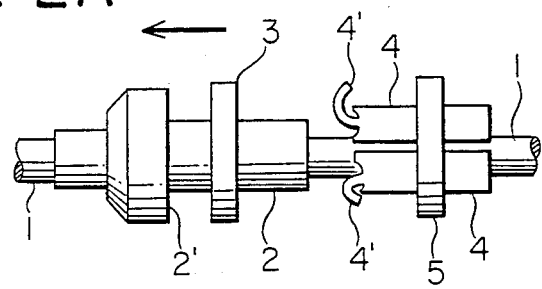
FIG. 2(A) being a diagram of assistance in explaining the assembly procedures.
Figure 2B:
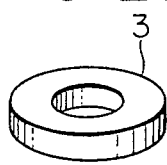
FIG. 2(B) being a perspective view of the electrically conductive rubber used in this invention.
Figure 2C:
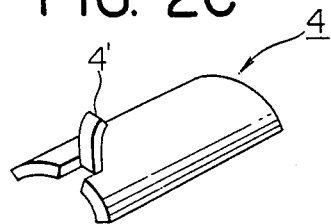
FIG. 2(C) being a perspective view of the commutator segment used in this invention.

In FIG. 2(A), the insulating cylinder 2 is first fixedly fitted to the motor rotating shaft 1. Then, the electrically conductive rubber ring 3 formed from electrically conductive rubber into a ring shape as shown in FIG. 2(B) is fitted onto the insulating cylinder 2 and slid in the direction shown by an arrow in the figure until the ring 3 comes in contact with the flange 2' provided on the insulating cylinder 2. Next, the commutator segments 4 shown in FIG. 2(C) are disposed on the insulating cylinder 2 in such a manner that the commutator terminals 4' formed integrally with the commutator segments 4 come in contact with the electrically conductive rubber ring 3. The insulating washer 5 is then press-fitted onto the commutator segments 4 until the commutator terminals 4' come in contact with the electrically conductive rubber ring 3.

The embodiment shown in FIG. 1 is assembled by the assembly process described in the foregoing, referring to FIG. 2. Since the commutator terminals 4' are kept pressed onto the electrically conductive rubber ring 3 by the insulating washer 5, an electrical connection between the commutator terminals 4' and the electrically conductive rubber ring 3 is positively effected by the heat generated during the welding of the abovementioned rotor windings to the commutator terminals 4'.

Now, changes with time in resistance value between commutator terminals according to this invention will be described in the following, referring to Table 1 below and FIG. 3.

Table 1 shows the measurement results of resistance value between the commutator terminals at atmospheric temperature of 50° C. and relative humidity of 95%. FIG. 3 is a graphic representation of the results shown in Table 1. In the table and figure, (A) indicates the results obtained with this invention, (B) the results obtained with a conventional method where an electrically conductive rubber ring as described at the beginning of the present Specification, and (C) the results obtained with the abovementioned conventional method where connection with an electrically conductive adhesive was omitted. Numerical values given in parentheses in Table 1 represent normalized resistance values based on a figure of 100 for the initial values. In FIG. 3, the coordinate represents the abovementioned normalized values and the abscissa elapsed time.

TABLE 1

| | \multicolumn{5}{c|}{TIME} |
|---|---|---|---|---|---|
| | 0 | 131 | 371 | 539 | 1035 |
| (A) | 385 | 374 | 375 | 377 | 379 |
| | (100) | (97) | (97) | (98) | (98) |
| (B) | 195 | 205 | 203 | 200 | 204 |
| | (100) | (105) | (104) | (103) | (105) |
| (C) | 500 | 675 | 1000 | 2000 | 5000 |
| | (100) | (135) | (200) | (400) | (1000) |

Table 1 and FIG. 3 clearly indicate the superior stability with time of the resistance value of the spark-quenching means according to this invention.

Figure 4:
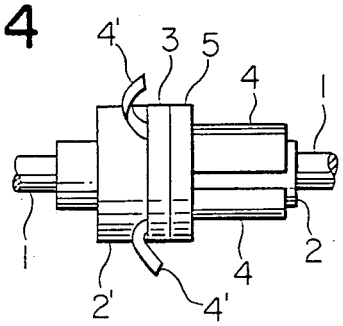
FIG. 4 shows another embodiment of this invention.

FIG. 4 shows another embodiment of this invention. In the figure, like numerals correspond with like parts in FIG. 1. In FIG. 4, the commutator terminals 4' are sandwiched between the flange 2' and the electrically conductive rubber ring 3. In this state, the end face of the electrically conductive rubber ring 3 is brought to intimate contact with the commutator terminal 4' by the heat generated during the welding of the rotor windings to the commutator terminals. In other words, the commutator terminals 4' are sandwiched between the flange 2' and the electrically conductive rubber ring 3 in the embodiment shown in FIG. 4, whereas the commutator terminals 4' are sandwiched between the electrically conductive rubber ring 3 and the insulating washer 5 in the embodiment shown in FIG. 1. That the commutator terminals 4' are brought to intimate contact with the electrically conductive rubber ring 3 by heating is common to both the embodiments shown in FIGS. 1 and 4. Consequently, the embodiment shown in FIG. 4 has the same characteristics as the embodiment shown in FIG. 1.

As described above, this invention makes it possible to achieve an effective electrical connection between a spark-quenching electrically conductive rubber ring and commutator terminals, and to provide miniature motors having a stable spark-quenching means at low cost, coupled with the availability of low-cost electrically conductive rubber.

What is claimed is:

1. A miniature motor comprises a plurality of commutator segments having corresponding commutator terminals each being connected to rotor windings, the commutator segments being disposed on an insulating cylinder fixedly fitted to a motor rotating shaft, each of said commutator terminals having an extending part from said insulating cylinder substantially at a right angle, each of said commutator segments being connected to a spark quenching resistor, a disc-shaped electrically conductive rubber ring fitted onto said insulating cylinder in such a manner that one end face of said electrical conductive rubber ring comes in contact with each said extending part associated with said commutator terminals; said electrically conductive rubber ring being in intimate contact and being connected electrically with each said extending parts of said commutator terminals by heating.

2. A miniature motor as set forth in claim 1 wherein said electrically conductive rubber ring is in intimate contact and is connected electrically with said commutator terminals by the heat generated during the welding of rotor windings to said commutator terminals.

3. A miniature motor having a motor shaft, an insulating cylinder fitted on said shaft, a commutator segments with corresponding commutator terminals integrally formed with said commutator segments, said commutator segments fitting over said insulating cylinder, an insulated washer on said commutator segments for fixing said commutator segments on said insulating cylinder, an electrically conductive rubber ring fitting over said insulating cylinder abutting said insulating washer, said commutator terminals extending beneath said insulated washer and outwardly therefrom, and a flange abutting said rubber ring.

* * * * *